(12) United States Patent
Chakraborty et al.

(10) Patent No.: US 10,637,589 B1
(45) Date of Patent: Apr. 28, 2020

(54) SYSTEM AND METHOD FOR PERFORMING OVER-THE-AIR TESTING ON DEVICES UNDER TEST

(71) Applicant: Keysight Technologies, Inc., Santa Rosa, CA (US)

(72) Inventors: Kaushik Chakraborty, Penang (MY); Darrin Russell, Bowie, TX (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/527,645

(22) Filed: Jul. 31, 2019

(51) Int. Cl.
*H04W 24/06* (2009.01)
*H04B 17/17* (2015.01)
*H04B 17/00* (2015.01)
*H04B 17/29* (2015.01)
*H04B 17/318* (2015.01)
*H04W 4/80* (2018.01)

(52) U.S. Cl.
CPC ......... *H04B 17/0085* (2013.01); *H04B 17/29* (2015.01); *H04B 17/318* (2015.01); *H04W 4/80* (2018.02); *H04W 24/06* (2013.01)

(58) Field of Classification Search
None
See application file for complete search history.

(56) References Cited

U.S. PATENT DOCUMENTS

| | | | | |
|---|---|---|---|---|
| 7,110,721 B2 * | 9/2006 | Kurita | ................... | H04B 17/16 455/67.11 |
| 7,773,531 B2 * | 8/2010 | Olgaard | ................. | H04L 43/50 370/241 |
| 7,950,004 B2 * | 5/2011 | Vieira | ................. | G06F 11/3688 714/25 |
| 8,467,735 B2 * | 6/2013 | Giles | .................... | H04B 17/309 455/67.11 |
| 8,600,311 B2 * | 12/2013 | Gregg | .................. | H04B 17/309 455/67.11 |

(Continued)

OTHER PUBLICATIONS

Bluetooth® Testing with the R&S®CMW Wideband Radio Communication Tester, Nov. 2017, https://scdn.rohde-schwarz.com/ur/pws/dl_downloads/dl_common_library/dl_brochures_and_datasheets/pdf_1/CMW_Testing_Bluetooth_app-bro_en_5214-6745-92_v0100.pdf., pp. 1-36.

(Continued)

*Primary Examiner* — Tuan A Tran (57) ABSTRACT

A method for testing a DUT, operating in signaling mode, includes receiving sets of advertisements from the DUT over advertising channels; sending queries over one of the advertising channels in each set of advertisements in response to the advertisements; receiving acknowledgements over the one of the advertising channels in response to at least some of the scan requests, respectively; identifying respective advertising channels on which the queries are sent and the acknowledgements are received for each set of advertisements; calculating PER for each of the advertising channels using a ratio of the received and sent acknowledgements and queries; determining RF power of each of the advertising channels based on RF bursts associated with the advertisements and/or acknowledgements; temporally associating the PER and RF power based on timestamping; and determining quality of an RF radio in the DUT based on the associated PER and RF power.

20 Claims, 3 Drawing Sheets

(56) References Cited

U.S. PATENT DOCUMENTS

| | | | | |
|---|---|---|---|---|
| 8,660,812 B2* | 2/2014 | Gregg | .................... | H04B 17/11 |
| | | | | 340/7.41 |
| 8,693,351 B2* | 4/2014 | Olgaard | .................... | H04L 1/24 |
| | | | | 370/242 |
| 8,867,372 B2* | 10/2014 | Olgaard | ................ | H04W 48/06 |
| | | | | 370/242 |
| 9,158,642 B2* | 10/2015 | Olgaard | .............. | G06F 11/2733 |
| 9,451,484 B2* | 9/2016 | Boulton | ................ | G01S 5/0221 |
| 9,485,040 B2* | 11/2016 | Olgaard | .............. | H04B 17/318 |
| 9,514,016 B2* | 12/2016 | Richardson | ......... | G06F 11/2733 |
| 9,641,964 B2 | 5/2017 | Kulkarni et al. | | |
| 9,749,065 B2* | 8/2017 | Olgaard | ................ | H04B 17/17 |
| 9,749,066 B2* | 8/2017 | Olgaard | ............ | H04B 17/0085 |
| 9,825,717 B2* | 11/2017 | Olgaard | ................ | H04B 17/15 |
| 9,871,601 B2* | 1/2018 | Olgaard | ................ | H04B 17/17 |
| 10,084,555 B1* | 9/2018 | Olgaard | .............. | H04W 52/325 |
| 10,257,618 B2 | 4/2019 | Solum et al. | | |
| 2016/0352611 A1 | 12/2016 | Olgaard | | |

OTHER PUBLICATIONS

Wireless Connectivity Test Set MT8862A, May 9, 2018, https://dl.cdn-anritsu.com/en-en/test-measurement/files/Brochures-Datasheets-Catalogs/Brochure/mt8862a-e1300.pdf, pp. 1-20.

* cited by examiner

SYSTEM AND METHOD FOR PERFORMING OVER-THE-AIR TESTING ON DEVICES UNDER TEST

BACKGROUND

Many modern electronic devices rely on wireless communication, such as Bluetooth technologies, particularly Internet of things (Iot) devices. One Bluetooth standard is Bluetooth low energy (BLE), including versions BLE 4.2, BLE 5.0 and BLE 5.1, which have low power consumption compared to classic Bluetooth standards. Examples of electronic devices that rely on BLE include hearing aids, smart watches, smart sensors (e.g., temperature sensors), insulin pumps, and the like.

Manufacturing testing is performed on BLE devices, referred to as devices under test (DUTs), in order to test the quality of the corresponding receivers and transmitters. Both receiver and transmitter tests are key for a manufacturer to make proper quality assurance determination with regard to its products. Conventional testing includes use of a physical wire connection between the tester and a DUT, and the DUT must be in a non-signaling mode at the time of testing. There are several drawbacks to this type of testing. For example, the DUTs may be very small, in which case there may not be sufficient physical space for populating test points to enable the testing. Also, in order to performing testing in the non-signaling mode, non-signaling firmware must be flashed in the DUT, which increases production and testing time. Also, after performing the test using non-signaling firmware, the signaling firmware must be flashed back in the DUT for normal operations. When the final product requires manual assembly of radio frequency (RF) and power lines inside the DUT, it is difficult to determine the performance of the DUT after final assembly since the test points will not be accessible following the assembly. In addition, the DUTs are tested one at a time with regard to RF performance, which considerably increases test time when multiple DUTs are being tested.

Therefore, a more efficient technique is needed for testing receivers and transmitters in DUTs, where the testing may be performed in the signaling mode, and multiple DUTs may be tested simultaneously.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a", "an" and "the" are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Figure 1:
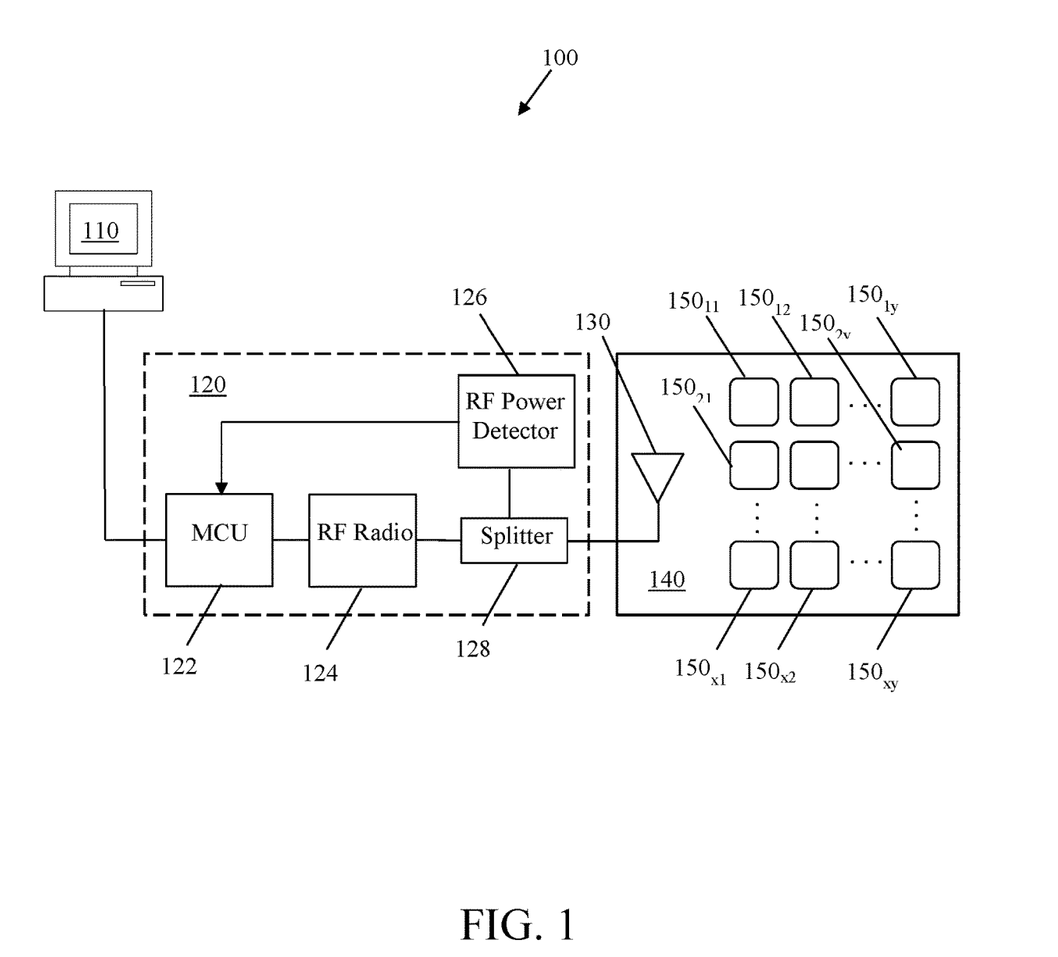
FIG. 1 is a simplified block diagram of a system for performing over-the-air (OTA) testing of one or more devices under test (DUTs), operating in a signaling mode, according to a representative embodiment.

FIG. 1 is a simplified block diagram of a system for performing OTA testing of one or more DUTs, operating in a signaling mode, according to a representative embodiment.

Referring to FIG. 1, test system 100 includes a host computer 110, a test instrument 120 and an antenna 130 for communicating wirelessly with multiple DUTs in a test chamber 140, where the DUTs are indicated by representative DUTs $150_{11}$, $150_{12}$ ... $150_{1y}$; $150_{21}$, $150_{22}$ ... $150_{12}$; and $150_{x1}$, $150_{2}$ (x and y being positive integers) (collectively referred to as DUTs $150_{11}$, $150_{12}$ ... $150_{xy}$). The test system 100 is generally configured to determine substantially simultaneously the functionality and quality of radio frequency (RF) receivers and RF transmitters of the DUTs $150_{11}$, $150_{12}$ ... $150_{xy}$ using packet error rates (PERs) and detected power of RF signals, respectively, communicated between the test instrument 120 and each of the DUTs $150_{11}$, $150_{12}$ ... $150_{xy}$. Notably, because the testing is performed OTA, the DUTs $150_{11}$, $150_{12}$ ... $150_{xy}$ are tested in signaling mode, as opposed to non-signaling mode. Therefore, no updates of software or firmware need to be performed, such as flashing non-signaling firmware prior to testing, thereby reducing test time. The test system 100 further reduces test time by simultaneously testing all of the DUTs $150_{11}$, $150_{12}$ ... $150_{xy}$. For example, in an embodiment, up to 40 DUTs (e.g., n=5, m=8) may be tested simultaneously OTA by the test system 100 in less than about 10 seconds. Although FIG. 1 depicts a scenario in which multiple DUT are tested simultaneously, it is understood that the test system 100 may used to test a single DUT in substantially the same manner as described herein, without departing from the scope of the present teachings.

The test instrument 120 includes a microprocessor control unit (MCU) 122, an RF radio 124, a power detector 126, and an RF splitter 128. A user may access the test instrument 120 from the host computer 110, for example, or other external computing device. However, in alternative embodiments, the test instrument 120 may include a user interface, in which case the user may directly access the test instrument 120, without departing from the scope of the present teachings. The host computer 110 includes its own processor, such as a central processing unit (CPU), memory for storing executable software/firmware code that enables performance of various functions described herein, and a display for displaying a graphical user interface (GUI). The memory may be implemented by any number, type and combination of random access memory (RAM) and read-only memory (ROM), for example, or other volatile and non-volatile memories, and may store various types of information, such as computer programs and software algorithms executable by the processor. The user accesses the GUI using any input device, such as a keyboard, mouse and/or touch screen, in order to initiate the testing process. For example, the user may enter the number of DUTs $150_{11}$, $150_{12}$ ... $150_{xy}$ being tested and a test time T in which to complete the testing.

Alternatively, the host computer 110 may determine the test time T based, in part, on the number of DUTs $150_{11}$, $150_{12}$ ... $150_{xy}$ being tested. The host computer 110 then initiates the testing, sending a command to the MCU 122 to begin performing the PER and RF power measurements, along with the test time T and the number of DUTs $150_{11}$, $150_{12}$ ... $150_{xy}$. According to various embodiments, the test time T may be about 5 to 6 seconds to test simultaneously up to 40 DUT, for example, although other times may be incorporated without departing from the scope of the present teachings.

The MCU 122 may include a processor, memory and analog to digital converters (ADCs). The processor may include one or more computer processors, digital signal processors (DSPs), field-programmable gate arrays (FPGAs), application specific integrated circuits (ASICs), or combinations thereof, using any combination of hardware, software, firmware, hard-wired logic circuits, or combinations thereof. The memory may be implemented by any number, type and combination of RAM and ROM, for example, or other volatile and non-volatile memories, and may store various types of information, such as computer programs and software algorithms executable by the processor. The MCU 122 is configured to begin the testing of the DUTs $150_{11}$, $150_{12}$ ... $150_{xy}$ in response to the command from the host computer 110, causing the RF radio 124 to begin receiving and sending test messages, and the RF power detector 126 to begin detecting power of the received test messages.

The RF radio 124 includes one or more transmitters and receivers for transmitting and receiving RF signals including test messages to and from the DUTs $150_{11}$, $150_{12}$ ... $150_{xy}$, as well as a radio processor and memory for controlling operations of the transmitters and receivers, similar to those described above with reference to the MCU 122. In various embodiments, the RF radio 124 may be a Bluetooth radio configured according to well known Bluetooth standards, such as BLE 4.2, BLE 5.0 or BLE 5.1, for example, although other wireless RF communications standards and other Bluetooth standards may be implemented, without departing from the scope of the present teachings. For purposes of illustration and not limitation, the functionality of the test system 100, and corresponding methods, will be described with reference to BLE 4.2 and 5.0, although it is understood that the methods may be implemented by other BLE and Bluetooth standards, or other wireless communications standards, without departing from the scope of the present teachings.

Upon initiation of the testing, the RF radio 124 receives advertisements from each of the DUTs $150_{11}$, $150_{12}$ ... $150_{xy}$, during the test time T. The advertisements include packets identifying the DUTs $150_{11}$, $150_{12}$ ... $150_{xy}$, respectively, as well as additional advertisement data, such as DUT name, DUT capability, and the like. The packets identifying the DUTs $150_{11}$, $150_{12}$ ... $150_{xy}$, may indicate the respective media access control (MAC) addresses, for example, although other identifying data may be incorporated without departing from the scope of the present teachings. The DUTs $150_{11}$, $150_{12}$ ... $150_{xy}$, are programmed to send out the advertisements automatically at various intervals when searching for RF receivers, as is known in the art. In an embodiment, each of the DUTs $150_{11}$, $150_{12}$ ... $150_{xy}$ periodically transmits and the RF radio 124 receives multiple advertisements over multiple advertising channels at different frequencies. For example, BLE 4.2 and 5.0, and other Bluetooth standards, provide for three advertising channels, e.g., channel 37 (2402 MHz), channel 38 (2426 MHz) and channel 39 (2480 MHz), among 40 available channels. Thus, three advertisements sent by one of the DUTs $150_{11}$, $150_{12}$ ... $150_{xy}$ over the three advertising channels, respectively, would be included in one advertising event. Each advertisement is transmitted by the one of the DUTs $150_{11}$, $150_{12}$ ... $150_{xy}$ at a DUT power, which may vary among the DUTs $150_{11}$, $150_{12}$ ... $150_{xy}$, and is one of the parameters being measured during testing.

Notably, the DUTs $150_{11}$, $150_{12}$ ... $150_{xy}$ start transmitting advertisements on advertising channels 37, 38 and 39 upon being powered up to enable connection with a central BLE device (in this case, the RF radio 124). According to BLE 4.2 and 5.0, and other Bluetooth standards, there are four different types of advertisements: (i) connectable undirected advertising (ADV_IND), (ii) connectable directed advertising (ADV_DIRECT_IND), (iii) scannable undirected advertising (ADV_SCAN_IND), and (iv) non-connectable undirected advertising (ADV_NONCONN_IND). Of these four types of advertisements, only connectable undirected advertising (ADV_IND) and scannable undirected advertising (ADV_SCAN_IND) support for scan request and scan response messaging, and thus the DUTs $150_{11}$, $150_{12}$ ... $150_{xy}$ are connectable undirected advertising (ADV_IND) and scannable undirected advertising (ADV_SCAN_IND) capable.

In response to receiving an advertisement, the RF radio 124 transmits an RF signal including a request message or query to the one of the DUTs $150_{11}$, $150_{12}$ ... $150_{xy}$ that sent the advertisement. The request message is transmitted at the same frequency (over the same channel) as the advertisement and at the power of the RF radio 124. The RF radio power is typically different from the DUT power of any of the DUTs $150_{11}$, $150_{12}$ ... $150_{xy}$, although the RF radio power may be the same as the DUT power in some scenarios. When using BLE 4.2 and 5.0, and other Bluetooth standards, the request message may be a scan request (SCAN_REQ), which is transmitted over the one of the three advertising channels on which the corresponding advertisement was sent. The RF radio 124 does not necessarily respond to every advertisement within one advertising event, depending on the relative timing of receiving the advertisements. For example, in an embodiment, each advertising event includes one scan request sent over one of the three channels on which the three advertisements of the advertising event are received.

In response to the request message, the one of the DUTs $150_{11}$, $150_{12}$ ... $150_{xy}$ is supposed to send a response message or acknowledgement, which is transmitted one the same channel (at the same frequency) as the advertisement and the request message. When the response message is sent and received by the RF radio 124, this indicates that the receiver of the one of the DUTs $150_{11}$, $150_{12}$ ... $150_{xy}$ has successfully received the request message and is otherwise functioning properly. The RF radio 124 therefore keeps track of the number of request messages sent and the number of corresponding response messages received for each of the channels of each of the DUTs $150_{11}$, $150_{12}$ ... $150_{xy}$. Comparison (e.g., the ratio) of the number of request messages and the number of corresponding response messages indicates the PER of the corresponding each receiver channel of one of the DUTs $150_{11}$, $150_{12}$ ... $150_{xy}$, which may be determined by the MCU 122, as discussed below.

When using BLE 4.2 and 5.0, and other Bluetooth standards, the response message may be a scan response (SCAN_RESP). The scan response includes a simple acknowledgement (ACK) that can be read by the RF radio 124. The scan response may also include additional data, such as the type of the DUT, although such additional data may not be included, without departing from the scope of the present teachings. For each set of advertisements in an advertising event sent on the available advertising channels by the same one of the DUTs $150_{11}$, $150_{12}$ ... $150_{xy}$, a corresponding scan request is provided in response to one of the advertisements, and a scan response is provided in response to the scan request, which constitute an advertising event. The set of transmissions by the one of the DUTs $150_{11}$, $150_{12}$ ... $150_{xy}$ and the RF radio 124 during in an advertising event may be considered a set of RF bursts, including advertisements, scan requests and scan responses. That is, since BLE 4.2 and 5.0, and other Bluetooth standards provide for three advertising channels, an advertising event (and corresponding RF bursts) with respect to one of the DUTs $150_{11}$, $150_{12}$ ... 150 includes three advertisements on the three advertising channels, respectively, one scan request on one of the three advertising channels, and one scan response on the same one of the three advertising channels. Also, during the test time T, advertising events continually occur between the RF radio 124 and the DUTs $150_{11}$, $150_{12}$ ... $150_{xy}$, so that by the end of the test time T, the RF radio 124 has accumulated multiple advertising events for each of the DUTs $150_{11}$, $150_{12}$ ... $150_{xy}$.

As mentioned above, the RF radio 124 keeps track of every scan request sent by the RF radio 124 that results in receipt of a corresponding scan response (as a pass packet) and every scan request sent by the RF radio 124 that does not result in receipt of a corresponding scan response (as a fail packet), which information may be used to determine the quality of the channels/receiver of each of the DUTs $150_{11}$, $150_{12}$ ... $150_{xy}$. In other words, every advertising event result in an indication of a successful or failed exchange of scan messages between the RF radio 124 and one of the DUTs $150_{11}$, $150_{12}$ ... $150_{xy}$. The RF radio 124 sends the indications of successful and failed exchanges to the MCU 122, which timestamps them. The MCU 122 determines the PER of each advertising channel of each of the DUTs $150_{11}$, $150_{12}$ ... $150_{xy}$ by determining the ratio of scan responses to the corresponding scan requests for each channel. That is, for each advertising channel, PER=(1.0−(number of scan responses/number of scan requests))*100, or PER=(1.0−(fail packets/pass packets))*100. Alternatively, or in addition, the RF radio 124 may calculate the ratios for the PER of each channel and send timestamped ratios/PERs to the MCU 122, or the MCU 122 may timestamp received ratios/PERs. In various embodiments, the RF radio 124 is configured to determine additional indicators of the quality of the receivers in the DUTs $150_{11}$, $150_{12}$ ... $150_{xy}$, such as determining received signal strength indicator (RSSI) for each of the RF bursts, as would be apparent to one of ordinary skill in the art.

Meanwhile, the RF power detector 126 is configured to detect RF power of the transmitters in the DUTs $150_{11}$, $150_{12}$ ... $150_{xy}$ by detecting RF power of the RF signals carrying the advertisements and/or the response messages transmitted by the DUTs $150_{11}$, $150_{12}$ ... $150_{xy}$, discussed above. The RF power detector 126 may include a diode peak detector, for example, for determining the RF power values of the RF signals, and a DC converter for converting the detected RF power values to DC power signals. Of course, other types of RF power detection may be incorporated without departing from the scope of the present teachings. The RF power detector 126 receives the RF signals through the RF splitter 128. The DC power signals are by the RF power detector 126 to the MCU 122, which timestamps the DC power signals and performs further processing, as discussed below. When using BLE 4.2 and 5.0, and other Bluetooth standards, for example, the RF power detector 126 detects RF power associated with each advertising event by detecting the RF power of the advertisements in the three advertising channels and/or the scan responses in one of the three advertising channels. The detected RF power is associated with the specific advertising channel in which the respective advertisement and/or scan response was received. That way, the RF power of each advertising channel of each of the DUTs $150_{11}$, $150_{12}$ ... $150_{xy}$ may be determined.

The MCU 122 is further configured to receive and timestamp the numbers of pass and fail packets from the RF radio 124 (and/or the ratios of scan responses to scan requests), and to receive and timestamp DC power signals from the RF power detector 126, as mentioned above. The MCU 122 includes analog to digital converters (ADCs) to digitize the DC power signals received from the RF power detector 126, which the MCU 122 may capture at about 10 nanosecond intervals, for example, although any compatible sampling rate may be incorporated without departing from the scope of the present teachings. In various embodiments, the MCU 122 may also receive and timestamp advertisement and scan response data from the RF radio 124, in which case the MCU 122 may perform the pass/fail packet determination itself. The MCU 122 calculates the PER for each advertising channel of the receiver for each of the DUTs $150_{11}$, $150_{12}$ ... $150_{xy}$ using the ratio of the scan responses and the scan requests, as discussed above. The MCU 122 also determines the RF power of each of the RF bursts from each advertising channel of the transmitter for each of the DUTs $150_{11}$, $150_{12}$ ... $150_{xy}$ using the DC power signals.

The MCU 122 temporally associates the PER of each receiver channel and the RF power of each transmitter channel using the timestamping in order to provide complete information regarding the quality of the receiver/transmitter (DUT RF radio) of each of the DUTs $150_{11}$, $150_{12}$ ... $150_{xy}$. For example, the MCU 122 may determine the quality of the DUT RF radio by varying the transmit power level of the RF radio 124 before sending a scan request in an advertising event. For example, when a DUT's sensitivity level is known to be −80 dB, then the transmit power level of the RF radio 124 may be adjusted near −80 dB for determining the PER. When the DUT's sensitivity level is unknown, a power level sensitivity search may be performed by stepping through various power levels of transmit power of the RF radio 124 to determine the precise PER, and thus DUT RF radio receive sensitivity, in response to the various power levels. The MCU 122 may also make determinations regarding other parameters of the DUTs $150_{11}$, $150_{12}$ ... $150_{xy}$ based, at least in part, on the PERs and the RF powers, as well as information such as how frequently the DUTs $150_{11}$, $150_{12}$ ... $150_{xy}$ transmit advertisements and at what power levels. For example, the MCU 122 may predict battery drawing rate and determine expected battery life of each of the DUTs $150_{11}$, $150_{12}$ ... $150_{xy}$ using the RF power and frequency with which each of the DUTs $150_{11}$, $150_{12}$ ... $150$ transmits advertisements. This information informs customers about the quality of the DUTs $150_{11}$, $150_{12}$ ... $150_{xy}$.

The MCU 122 sends information to the host computer 110, which is configured to provide all or part of that information, via the GUI. For example, the host computer 110 may display the calculated PER of the receiver channels and the determined RF power of the transmitter channels, along with a pass/fail indication, corresponding to each of the DUTs $150_{11}$, $150_{12}$ ... $150_{xy}$. As mentioned above, the method is described with respect to simultaneously testing multiple DUTs; however, it is understood that the method may be performed with respect to a single DUT or one DUT at a time, as well.

Figure 2:
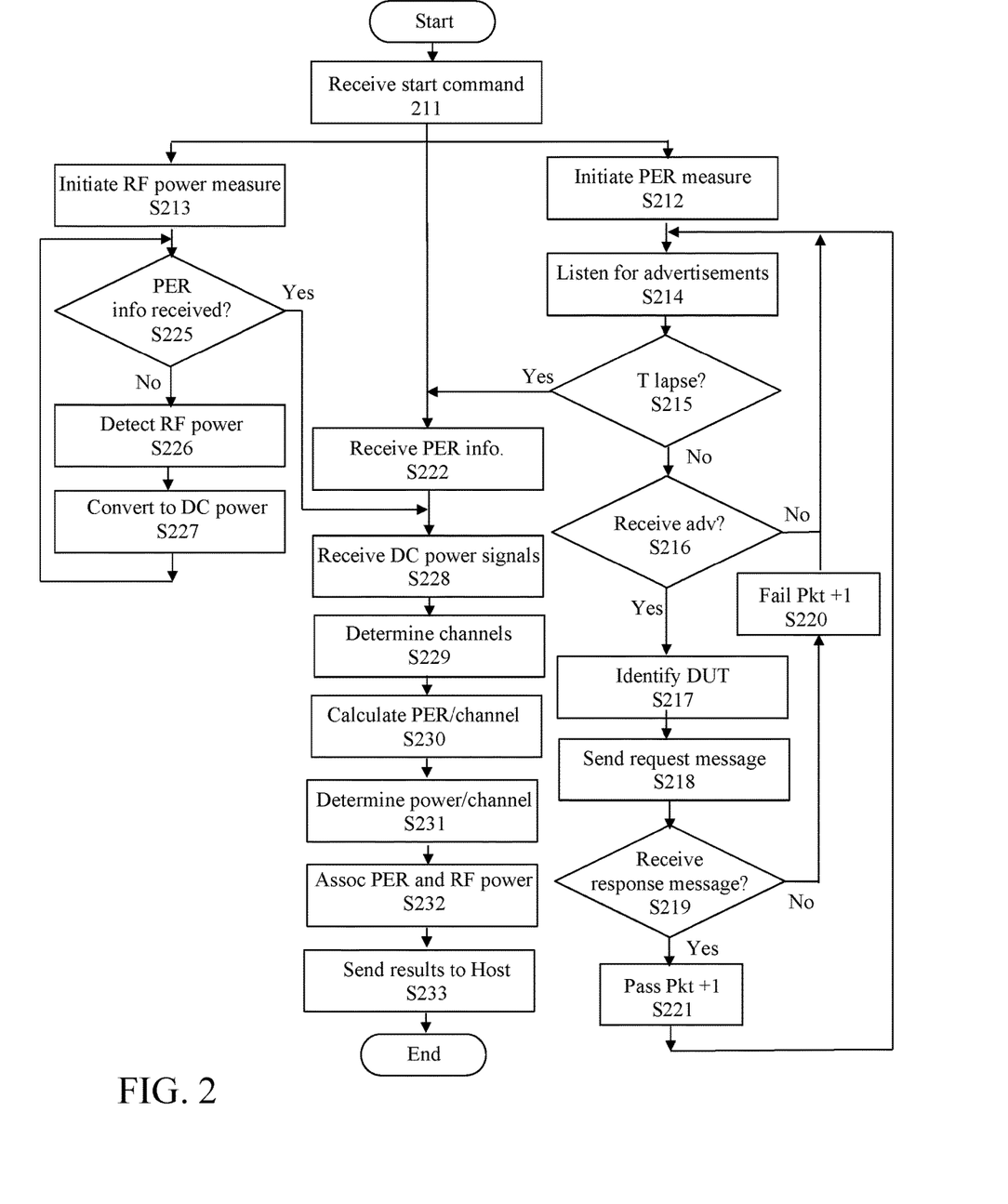
FIG. 2 is a simplified flow diagram of a method for performing OTA testing of one or more DUTs, operating in a signaling mode, according to a representative embodiment.

FIG. 2 is a simplified flow diagram of a method for performing OTA testing of one or more DUTs, operating in a signaling mode, according to a representative embodiment. The method may be performed by the test instrument 120. Accordingly, the various steps may be performed by the MCU 122, the RF radio 124, and the power detector 126, as indicated below. Further, although the operations of FIG. 2 are described in a particular order, for purposes of illustration, it is understood that the operations are performed substantially in parallel to the extent manageable. For example, the processing steps performed by the MCU 122 may be performed, using multiple threads running simultaneously, while other steps are being performed by the RF radio 124 and the power detector 126, respectively.

Referring to FIG. 2, a start command is received in block S211 to begin performing OTA testing of multiple DUTs (e.g., DUTs $150_{11}$, $150_{12}$ ... $150_{xy}$) in order to determine, simultaneously, the quality of RF receivers and transmitters in the DUTs. The command may include the test time T during which measurements for the quality testing are performed. The command may be received from a host computer (e.g., host computer 110) or a direct user interface, for example. Performing the OTA testing of the multiple DUTs simultaneously means that the OTA testing is completed on all of the DUT within the test time T. Also, for the sake of convenience, the steps in FIG. 2 are described with reference to a single DUT, although it is understood that this same process will be performed on all the DUTs during the test time T.

In block S212, PER testing of the DUT receivers is initiated to be performed over the test time T. At substantially the same time, RF power detection of the DUT transmitters is initiated in block S213, also over the test time T. The PER testing may be performed data from the RF radio 124 and the RF power detection may be performed using data from the RF power detector 126, for example.

Referring first to the PER testing, for the sake of explanation, the RF radio 124 listens for advertisements from the DUT in block S214. In an embodiment, the RF radio 124 listens for the advertisements on designated advertisement channels of the DUTs, such as channels 37, 38 and 39 in BLE 4.2 and 5.0, for example. In block S215, it is determined whether the test time T has lapsed. When the test time T has not lapsed (block S215: No), it is determined whether an advertisement has been received in block S216. When no advertisement has been received (block S216: No), the process returns to block S214 to continue seeking advertisements from the DUT. When an advertisement has been received (block S216: Yes), the DUT that transmitted the received advertisement is identified in block S217, for example, using MAC address included in the advertisement. The MAC address may also be included in any scan responses from the DUT.

In block S218, a request message or query (e.g., scan request) is transmitted to the same DUT on the same channel in response to the received advertisement, and a timer is set at the time of transmission for a test time T during which a response message (e.g., scan response) is to be received from the DUT. For BLE 4.2 and 5.0, and other Bluetooth standards, the test time T may be 150 microseconds, for example, although other times may be incorporated without departing from the scope of the present teachings. Also, the advertisements must be connectable undirected advertising (ADV_IND) or scannable undirected advertising (ADV_S-

CAN_IND) messages, as discussed above, since they support sending the scan requests. Accordingly, an optional additional step (not shown) may be included following block S216 to determine whether a received advertisement is one of these two types of advertisements, where the process continues if it is and returns to block S214 if it is not. For example, the RF radio application may initialize the physical layer to look for advertisements, e.g., in block S214. When an advertisement is received by the physical layer, the time of advertisement is decoded and, when the type of the advertisement is determined to be connectable undirected advertising (ADV_IND) or scannable undirected advertising (ADV_SCAN_IND), the application instructs the physical layer to send the scan request to the DUT, e.g., in block S218.

It is determined in block S219 whether a response message or (e.g., scan response) has been received within the test time T. When a response message is not received (block S219: No), a fail packet indicator is incremented in block S220 and the process returns to block S214 to continue listening for advertisements. When a response message is received within the test time T (block S219: Yes), a pass packet indicator is incremented in block S221, and the process returns to block S214 to continue listening for advertisements from the DUT (for the remainder of time T).

When it is eventually determined in block S215 that the test time T has lapsed (block S215: Yes), PER information relating to the testing of the DUT receiver is received and timestamped by the MCU in block S222. That is, the MCU receives and timestamps at least the number of fail packets determined in block S220 and the number of pass packets determined in block S221 for each of the advertising channel in block S222.

Meanwhile, parallel processing is performed for the RF power detection initiated in block S213, at substantially the same time as the PER measurements are performed. After initiation, it is determined in block S225, whether the time stamped number of fail packets and number of pass packets have been received (e.g., by the MCU) in block S223, effectively indicating that the PER determination process has been completed. Alternatively, it may be determined whether the test time T has lapsed in block S224. When the number of fail/pass packets has not been received, or the test time T has not lapsed (block S225: No), RF power is detected in block S226 (e.g., by RF power detector 126) for the advertisements received in block S216 and the scan responses received in block S218 for the corresponding advertising channel of the DUT. In various embodiments, the RF power may be detected using only the advertisements, only the scan responses, or both. In block S227, the detected RF power is converted to DC power signals by a DC converter.

The process then returns to block S225 to determine whether the PER determination process has been completed yet (or the test time T has lapsed). Eventually, when the number of fail/pass packets has been received, and/or the test time T has lapsed (block S225: Yes), the DC power signals are received and timestamped by the MCU in block S228. Alternatively, the DC power signals may be received and timestamped as they are generated by the power detector, without departing from the scope of the present teachings.

In block S229, it is determined on which advertising channels messaging is performed. For example, the MCU may determine or identify the channels on which the advertisements, the request messages and the response messages have been transmitted/received, respectively. As mentioned above, an advertisement, a request message and a response message may be grouped with one or more other advertisements in an advertising event. For BLE 4.2 and 5.0, and other Bluetooth standards, for example, an advertising event includes a set of advertisements transmitted on the three advertising channels 37, 38 and 39, as well as a scan request and a corresponding scan response on one of the three advertising channels 37, 38 and 39. In this case, it may be determined in block S229 on which channel, in particular, the scan request and scan response of the advertising event have been transmitted/received (since the scan request and scan response are exchanged on the same channel). For example, the channel may be identified by comparing the relative RF powers of the advertisements, the scan request and the scan response for each of the advertising events, and/or analyzing and comparing the length of each of the advertising events. Determination of the advertising channels is discussed below with reference to FIGS. 3A, 3B and 3C.

The PER for each of the advertising channels is calculated in block S230, e.g., by dividing the number of fail packets by the number of pass packets, to get a ratio of failed scan responses to the scan requests, indicating the quality of the receiver in the DUT, from a sensitivity perspective. That is, for each advertising channel, PER=(1.0−(number of scan responses/number of scan requests))*100, or PER=(1.0−(fail packets/pass packets))*100. The RF power for each of the advertising channels is determined in block S231, indicating the quality of the transmitter in the DUT from a power perspective. For example, the RF power of each advertising channel may be determined by sampling and digitizing the received DC power signals using ADCs of the MCU, and by averaging the DC signals associated with the advertising channel. Also, using the timestamps, the PER determinations for the receiver from block S230 and the RF power determinations for the transmitter from block S231 may be associated with one another in block S232 to indicate corresponding receiver and transmitter characteristics of each channel.

The test results are sent to the host computer (e.g., host computer 110) in block S233 for additional processing and/or display. In various embodiments, additional information may be sent to the host computer as well. For example, the host computer may receive the test results (e.g., the determined PERs and detected RF powers of the advertising channels of the DUT), as well as various raw data, such as the numbers of fail packets and pass packets, and secondary channel advertisement data, such as connection intervals. The host computer may display this information in various combinations. As mentioned above, the host computer may include a GUI that enables the user to interact with the host computer to organize and display all or parts of the PERs and RF powers, and the raw data, and to cause the host computer to perform additional calculations.

Also, the host computer may determine additional information regarding the testing of the DUTs using the results and information provided by test instrument. For example, for DUTs that run on battery coin cells, the host computer may identify factors affecting battery drain and display the same, enabling efficient use of the battery and tracking battery life. For instance, a DUT that advertises frequently will drain more power from the battery than a DUT that advertises less frequently. So, the host computer may receive data from the MCU indicating the frequency of advertisement transmission, and calculate battery drain rate based on the frequency of advertisement transmission and the corresponding detected RF power levels associated with advertisement transmissions. The battery drain rate may be used for quality determinations, such as accepting or rejecting the DUT involved, or otherwise rating the quality of the DUT. Other information may include determining the effectiveness of antenna placement of the Bluetooth radio in the DUT based on the indicated quality of the Bluetooth radio. Also, the RF power levels of the advertising channels in a DUT may be compared to one another, which may enable selection of only one of the advertising channels to be used for advertising (e.g., the one with the lowest RF power, to conserve battery, as discussed above).

Figure 3A:
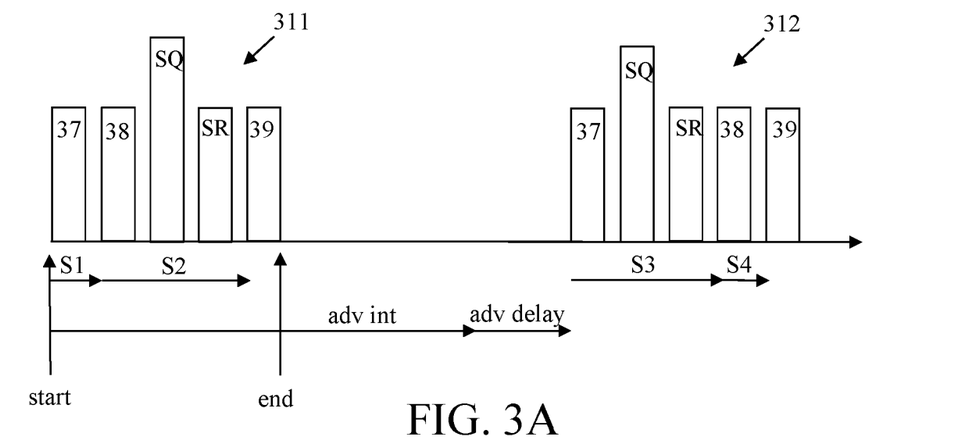
FIG. 3A is a simplified schematic diagram of power levels in two advertising events, where RF power of a test instrument RF radio is greater than RF power of the advertising channels of the DUT, according to representative embodiments.
Figure 3B:
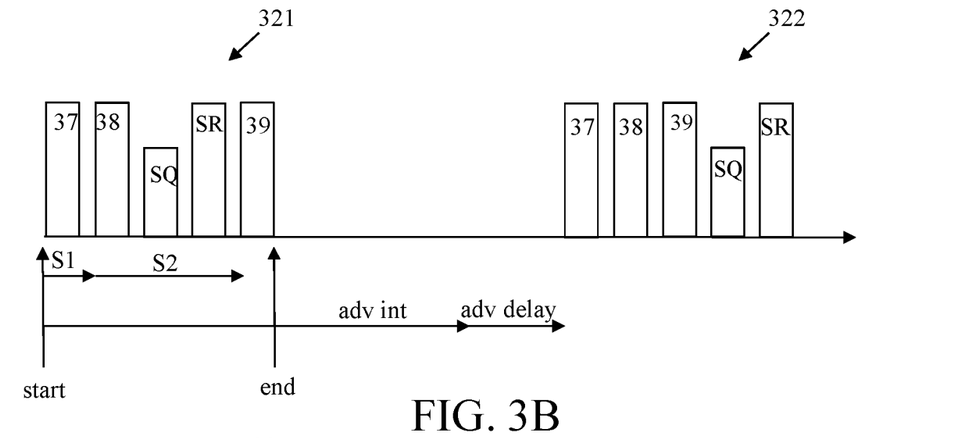
FIG. 3B is a simplified schematic diagram of power levels in two advertising events, where RF power of a test instrument RF radio is less than RF power of the advertising channels of the DUT, according to representative embodiments.
Figure 3C:
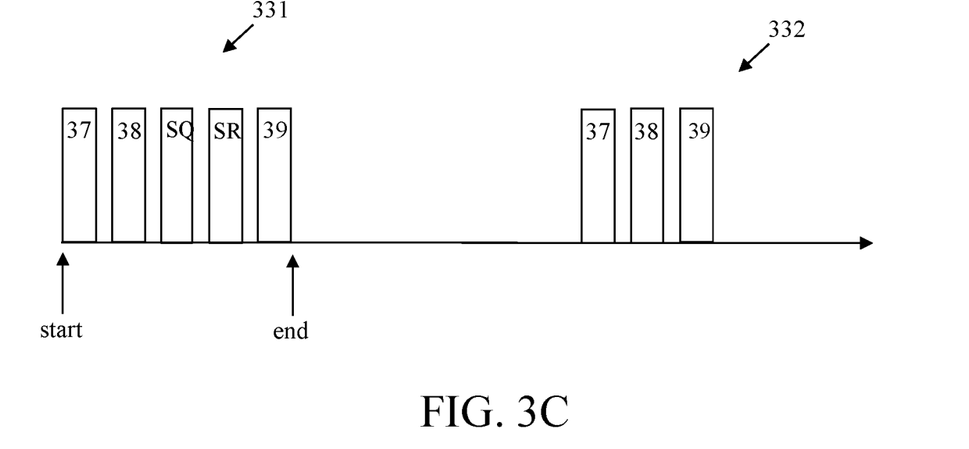
FIG. 3C is a simplified schematic diagram of power levels in two advertising events, where RF power of a test instrument RF radio is the same as RF power of the advertising channels of the DUT, according to representative embodiments.

As mentioned above, FIGS. 3A, 3B and 3C are simplified schematic diagrams of RF power levels for two advertising events in three advertising channels, used for determining channels, according to representative embodiments. Although three advertising channels are shown for each of the advertising events, it is understood that more or fewer advertising channels may be used in various embodiments. In FIG. 3A, the power level of the RF radio (e.g., RF radio 124) in the test instrument is greater than the power levels of the advertising channels of the DUT RF radio. In FIG. 3B, the power level of the RF radio in the test instrument is less than the power level of the advertising channels. In FIG. 3C, the power level of the RF radio in the test instrument is the same as the power level of the advertising channels. For the sake of convenience, the RF power levels of the three advertising channels (e.g., channels 27, 38 and 39) are assumed to be the same, although it is understood that the advertising channels may have the same or different RF power levels from one another (and from the RF power level of the test instrument) in various implementations. The channel determination for the representative advertising events in FIGS. 3A, 3B and 3C is indicated by block S229 in FIG. 2.

Referring to FIG. 3A, there are two illustrative advertising events, first advertising event 311 and second advertising event 312. Each of the first and second advertising events 311 and 312 includes advertisements received in the order of channel 37, channel 38 and channel 39, although it is understood that the advertisements may be received in alternative orders, without departing from the scope of the present teachings. In the depicted example, a scan request SQ is transmitted and a scan response SR is received by the RF radio on channel 38 in the first advertising event 311, and a scan request SQ is transmitted and a scan response SR is received by the RF radio on channel 37 in the second advertising event 312. Since the RF power of the RF radio is higher than the RF power of the DUT being tested, the scan request SQ is identifiable by the relatively higher RF power level.

Further, the relative location of the higher power scan request SQ, i.e., following two lower power signals in the first advertising event 311, indicates that the scan request SQ was transmitted on channel 38. That is, the first lower power signal corresponds to the advertisement on channel 37 and the second lower power signal corresponds to the advertisement on channel 38 in this example. Therefore, the location of the higher power scan request SQ adjacent to the second lower power signal indicates that the scan request SQ is also on channel 38. Similarly, the relative location of the higher power scan request SQ, i.e., following one lower power signal in the second advertising event 312, indicates that the scan request SQ was transmitted on channel 37, where the first lower power signal corresponds to the advertisement on channel 37. Generally, a power pattern of low-high-low-low-low indicates channel 37 is used for the scan request/response, a power pattern of low-low-high-low-low indicates channel 38 is used for the scan request/response, and a power pattern of low-low-low-high-low indicates channel 39 is used for the scan request/response.

In addition, the starts of the first and second advertising events 311 and 312 are temporally separated by an advertising interval (adv int) plus an advertising delay (adv delay). For example, the advertising interval may be an integer multiple of 0.626 ms in a range of about 20 ms to about 10.24 s (e.g., about 100 ms), and the advertisement delay is in a range of about 0 to about 10 ms. When the advertisements are connectable undirected advertising (ADV_IND), used in a low duty cycle mode, the advertising interval may be about 20 ms or greater. When the advertisements are scannable undirected advertising (ADV_SCAN_IND), the advertising interval may not be less than about 100 ms. The advertising delay is a pseudo-random value in a range of about 0 to about 10 ms, and may be generated by the link layer for each of the first and second advertising events 310 and 320.

Within an advertising event, the interval between receiving advertisements on different channels may be referred to as a scan interval. In the depicted example, the scan interval S1 between the advertisement on channel 37 and the advertisement on channel 38 is less than the scan interval S2 between the advertisement on channel 38 and the advertisement on channel 39. This is because the scan interval S2 includes the scan request and the scan response signals on channel 38, which add the timing of two additional scan windows to the scan interval S2. In the second advertising event 312, the longer scan interval would between the advertisement on channel 37 and the advertisement on channel 38, since the scan request and the scan response signals are transmitted on channel 37. That is, the scan interval S3 between the advertisement on channel 37 and the advertisement on channel 38 is greater than the scan interval S4 between the advertisement on channel 38 and the advertisement on channel 38.

Referring to FIG. 3B, there are two illustrative advertising events, first advertising event 321 and second advertising event 322. Each of the first and second advertising events 321 and 322 includes advertisements received in the order of channel 37, channel 38 and channel 39. In the depicted example, a scan request SQ is transmitted and a scan response SR is received by the RF radio on channel 38 in the first advertising event 321, and a scan request SQ is transmitted and a scan response SR is received by the RF radio on channel 39 in the second advertising event 322. Since the RF power of the RF radio is lower than the RF power of the DUT being tested, the scan request SQ is identifiable by the relatively lower RF power level.

Further, the relative location of the higher power scan request SQ, i.e., following two higher power signals in the first advertising event 321, indicates that the scan request SQ was transmitted on channel 38. That is, the first higher power signal corresponds to the advertisement on channel 37 and the second higher power signal corresponds to the advertisement on channel 38 in this example. Therefore, the location of the lower power scan request SQ adjacent to the second higher power signal indicates that the scan request SQ is also on channel 38. Similarly, the relative location of the lower power scan request SQ, i.e., following three higher power signals in the second advertising event 322, indicates that the scan request SQ was transmitted on channel 39, where the first higher power signal corresponds to the advertisement on channel 37, the second higher power signal corresponds to the advertisement on channel 38, and the third higher power signal corresponds to the advertisement on channel 39. Generally, a power pattern of high-low-high-high-high indicates channel 37 is used for the scan request/response, a power pattern of high-high-low-high-high indicates channel 38 is used for the scan request/response, and a power pattern of high-high-high-low-high indicates channel 39 is used for the scan request/response. The advertising intervals and advertising delays, as well as the scan intervals, are determined the same as discussed above with reference to FIG. 3A.

Referring to FIG. 3C, there are two illustrative advertising events, first advertising event 331 and second advertising event 332. Each of the first and second advertising events 331 and 332 includes advertisements received in the order of channel 37, channel 38 and channel 39. In the depicted example, a scan request SQ is transmitted and a scan response SR is received by the RF radio on channel 38 in the first advertising event 331, and no scan request SQ is transmitted in the second advertising event 332.

Since the RF power of the RF radio is the same as the RF power of the DUT being tested, the position of the scan request SQ cannot be identified by comparison of the RF power levels. Instead, it is determined whether the first advertising event 331 and the second advertising event 332 include a scan request and scan response exchange based on the total time of the advertising event, from advertising event start to advertising event end. It is further determined on which channel the scan request SQ and the scan response SR are exchanged by comparing the RF bursts. That is, the RF power information may be collected at a 10 nanosecond sampling rate, for example, by the RF power detector (e.g., RF power detector 126). Therefore, the length of each of these RF bursts can be determined. The length of the RF bursts for the advertisements should the same in all three advertising channels. So, the lengths of the RF bursts corresponding to advertisements (channel 37 and channel 39) and the total length of the RF bursts with the advertisement and the scan request and the scan response (channel 38) can be back calculated. The longer RF bursts are associated with channel 38, which therefore includes the scan request and the scan response. Generally, an RF burst pattern of long-short-short indicates channel 37 is used for the scan request/response, an RF burst power pattern of short-long-short indicates channel 38 is used for the scan request/response, and an RF burst pattern of short-short-long indicates channel 39 is used for the scan request/response. The advertising intervals and advertising delays, as well as the scan intervals, are determined the same as discussed above with reference to FIG. 3A.

Further, when an advertising event includes a scan request and a scan response (as in the first advertising event 331), the time between the start of the advertising event and the end of the advertising event is longer than when an advertising event does not include a scan request and a scan response (as in the second advertising event 332). This timing information may therefore be used generally to identify those advertising events that include the scan request and the scan response.

Accordingly, the channels on which the scan requests and scan responses, as well as the advertisements, are provided with respect to advertising events may be determined based on timing and the relative powers of the RF radio transmitters in the test instrument and the DUT. Channel specific data and calculations, such as the PERs, may then be properly associated with the channels. Identifying the channels using the MCU based on the timing and the relative powers is faster than alternative methods, which require decoding by the RF radio. For example, information regarding scan requests and corresponding scan responses in advertising events, for ultimately determining the PER of a DUT, may be collected as quickly as about every 20 ms (timing between advertising events).

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method of performing over-the-air (OTA) testing of a plurality of devices under test (DUTs), operating in a signaling mode, using an OTA test instrument, the method comprising:

receiving advertisements in a set of advertisements from each DUT of the plurality of DUTs over advertising channels, respectively;

sending scan requests over one of the advertising channels to each DUT in response to the received advertisements;

receiving scan responses over the one of the advertising channels from each DUT in response to at least some of the scan requests, respectively, wherein the advertisements, the scan request, and the respective scan response are included in an advertising event;

determining respective advertising channels on which the scan requests and the scan responses are sent and received for each advertising event;

calculating a packet error rate (PER) of radio frequency (RF) radio in each DUT using a ratio of the received scan responses and the sent scan requests corresponding to the DUT;

determining RF power of the advertising channels based on RF bursts associated with at least one of the advertisements and the scan responses, respectively;

timestamping the PER and the determined RF power, respectively, and temporally associating the PER and the determined RF power of the determined advertising channels based on the timestamping; and     determining quality of the RF radio in the DUT based on the associated PER and determined RF power.

2. The method of claim 1, wherein receiving the advertisements is in accordance with one of BLE 4.2, BLE 5.0 or BLE 5.1 Bluetooth standard.

3. The method of claim 2, wherein the each advertising event enables bilateral communication between the RF radio of the DUT and an RF radio of the OTA testing instrument.

4. The method of claim 3, wherein the advertisements comprise connectable undirected (ADV_IND) advertisements or scannable undirected (ADV_SCAN_IND) advertisements, in accordance with the Bluetooth standard.

5. The method of claim 2, wherein the advertising channels comprise channel 37, channel 38 and channel 39 in accordance with the Bluetooth standard.

6. The method of claim 1, wherein consecutive advertising events are separated in time by an advertisement interval and an advertisement delay, and wherein the advertisement interval is less than about 10.24 ms and greater than about 20 ms, and the advertisement delay is less than about 10 ms and greater than about 0 ms.

7. The method of claim 1, wherein the advertising channels on which the scan requests and the scan responses are sent and received for each advertising event are determined based on relative location of a different power level of the scan request compared to power levels of the advertisements.

8. The method of claim 1, where determining the advertising channels on which the scan requests and the scan responses are sent and received for each advertising event are determined based on relative widths of the RF bursts.

9. The method of claim 1, where determining the quality of the RF radio in each DUT comprises determining effectiveness of antenna placement of the RF radio in the DUT.

10. The method of claim 1, where determining the quality of the RF radio in each DUT comprises comparing RF power levels of the advertising channels.

11. The method of claim 1, wherein determining the RF power of the advertising channels comprises:
   detecting RF power signals corresponding to the advertising channels of the received advertising events at an RF power detector, and converting the RF power signals to corresponding DC signals;
   sampling the DC signals from the RF power detector using an analog to digital converter (ADC) in a microprocessor control unit (MCU); and
   processing the DC signals in the MCU by averaging the DC signals.

12. The method of claim 11, wherein the DC signals are sampled at about 10 nanoseconds.

13. A system for performing over-the-air (OTA) testing of a plurality of devices under test (DUT), operating in a signaling mode, the system comprising:
   a radio frequency (RF) radio configured to:
      receive sets of advertisements from each DUT over multiple advertising channels in accordance with a predetermined standard, each set of advertisements being included in an advertising event;
      send scan requests over one of the multiple advertising channels to each DUT in response to the received sets of advertisements, respectively;
      receive scan responses over the one of the multiple advertising channels from the DUT in response to at least some of the scan requests, respectively, wherein each advertising event further includes a scan request and a respective scan response;
   an RF power detector configured to detect RF power of RF bursts in the advertising events, respectively, and to convert the detected RF power to DC power signals; and
   a microprocessor control unit (MCU) programmed to:
      receive and timestamp the scan requests and the scan responses from the RF radio;
      receive and timestamp the DC power signals from the RF power detector;
      identify respective advertising channels on which the scan requests and the scan responses are sent and received;
      calculate a packet error rate (PER) of a receiver in an RF radio in each DUT using a ratio of the received scan responses and the sent scan requests;
      determine RF power of a transmitter in the RF radio in each DUT using the DC power signals;
      temporally associating the PER and the determined RF power based on the timestamping; and
      determine quality of the RF radio in each DUT based on the calculated PER and the determined RF power.

14. The system of claim 13, further comprising:
   a host computer in communication with the MCU, and programmed to display the at least the calculated PER, the determined RF power, and a pass/fail indication corresponding to the multiple advertising channels of each DUT.

15. The system of claim 13, wherein identifying the respective advertising channels on which the scan requests and the scan responses are sent and received comprises comparing relative locations of a different power level of the scan request compared to power levels of the advertisements.

16. The system of claim 13, wherein identifying the respective advertising channels on which the scan requests and the scan responses are sent and received comprises comparing relative widths of the RF bursts.

17. The system of claim 13, wherein the RF radio is further configured to determine received signal strength indicator (RSSI) of the receiver in each DUT.

18. The system of claim 13, wherein the predetermined standard comprises one of BLE 4.2, BLE 5.0 or BLE 5.1.

19. The system of claim 18, wherein the advertisements comprise connectable undirected (ADV_IND) advertisements or scannable undirected (ADV_SCAN_IND) advertisements.

20. A method of performing over-the-air (OTA) testing of a device under test (DUT), operating in a signaling mode, using an OTA test instrument, the method comprising:
   receiving sets of advertisements from the DUT over a plurality of advertising channels of a radio frequency (RF) radio in the DUT;
   sending queries over one of the advertising channels in each set of advertisements to the DUT in response to the received sets of advertisements, respectively;
   receiving acknowledgements over the one of the advertising channels in each set of advertisements from the DUT in response to at least some of the queries, respectively, wherein the sets of advertisements and the corresponding queries and acknowledgements are included in advertising events, respectively;
   identifying respective advertising channels on which the queries are sent, and the acknowledgements are received for each set of advertisements;
   calculating a packet error rate (PER) for each of the advertising channels using a ratio of the received acknowledgements and the sent queries corresponding to the advertising channel;
   determining RF power of each of the advertising channels based on RF bursts associated with at least one of the advertisements and the acknowledgements corresponding to the advertising channel;
   timestamping the PER and the RF power of each of the advertising channels, and temporally associating the PER and the determined RF power of the identified advertising channels based on the timestamping; and determining quality of the RF radio in the DUT based on the associated PER and determined RF power.

* * * * *